United States Patent

[11] 3,558,987

[72] Inventor Edward E. Lewis
Hillsborough, Calif.
[21] Appl. No. 774,346
[22] Filed Nov. 8, 1968
[45] Patented Jan. 26, 1971
[73] Assignee Subscription Television, Inc.
New York, N.Y.
a corporation of Delaware. by mesne assignments

[54] OVERHEATING PROTECTION CIRCUIT FOR A POWER TRANSISTOR
1 Claim, 4 Drawing Figs.

[52] U.S. Cl. .......... 317/33, 317/40
[51] Int. Cl. .......... H02l 5/04
[50] Field of Search .......... 317/33, 41, 99, 101, 234(1); 330/11P, 68

[56] References Cited

UNITED STATES PATENTS

| | | | |
|---|---|---|---|
| 3,363,060 | 1/1968 | Grodinsky .......... | (330/11P) |
| 3,373,318 | 3/1968 | Rogers .......... | (317/101CP) |
| 3,411,049 | 11/1968 | Trincossi et al. .......... | (317/234(1)) |
| 3,436,564 | 4/1969 | Enders .......... | 317/33 |

*Primary Examiner*—James D. Trammell
*Assistant Examiner*—Harry E. Moose, Jr.
*Attorney*—Christie, Parker and Hale

ABSTRACT: There is described an arrangement in which a power transistor chip is mounted on the end of a mounting stud together with a control transistor chip. The change in the base-to-emitter voltage drop of the control transistor chip with increase in temperature is used to operate a control circuit for turning off the power transistor with any overheating of the power transistor and associated mounting stud.

INVENTOR.
EDWARD E. LEWIS
BY
Christie, Parker & Hale
ATTORNEYS.

OVERHEATING PROTECTION CIRCUIT FOR A POWER TRANSISTOR

BACKGROUND OF THE INVENTION

This invention relates to power controllers, and more particularly, is concerned with a circuit for turning off a power transistor when it reaches an excessive temperature level.

Solid state relays and associated control circuits, referred to as power controllers, are usually encapsulated within a metal container having a header at one end. The header is provided with studs for securing the header to a chassis and the header has a multiprong plug by which electrical connections to the power controller are made. The power transistor has heretofore been mounted on the header to provide a heat-conductive sink through the header to the chassis. If the unit is not properly mounted, the power transistor may be subjected to destructive overheating, resulting in a costly replacement of the entire power controller unit.

SUMMARY OF THE INVENTION

The present invention is directed to an improved arrangement for protecting a power controller, such as the type described in my copending application, Ser. No. 774,250, filed Nov. 8, 1968, and assigned to the same assignee as the present invention, against destructive overheating. This accomplished, in brief, by securing the power transistor chip and a control transistor chip directly on the head of one of the mounting studs to provide a direct heat-conductive path from the transistor to the supporting chassis. The control transistor is biased so as to be nonconductive within the normal operating temperature range. If the temperature of the stud and power transistor rises to unsafe levels, as would occur, for example, if the stud were not fastened to the chassis, the control transistor turns on. The control transistor is part of a regenerative circuit that operates to turn off the power transistor and thereby protect the unit against further heating.

BRIEF DESCRIPTION OF THE DRAWING

For a better understanding of the invention, reference should be made to the accompanying drawing, wherein.

DESCRIPTION OF THE PREFERRED EMBODIMENT

Figure 1:
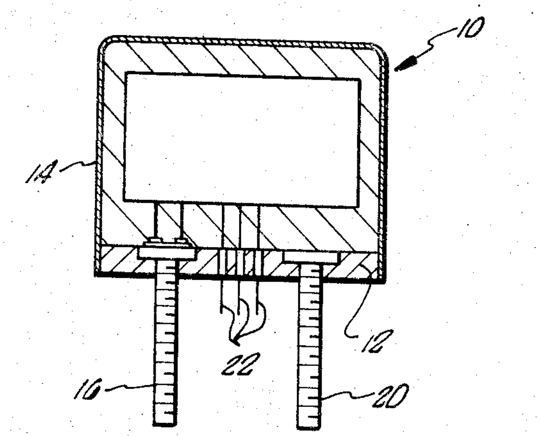
FIG. 1 is a cross-sectional view of an encapsulated power controller.

Referring to the drawing in detail, the numeral 10 indicates generally an encapsulated power controller of the type described in the above-identified patent application. The encapsulated circuit includes a header 12 and an enclosing metal can 14 which is hermetically joined to the header around its lower periphery. The header is provided with mounting studs, two of which are indicated at 16 and 20. Electrical connections are made by conductive pins 22 which extend through the header through suitable insulator seals in conventional manner. The pins 22 are arranged to engage a suitable connector plug when the unit 10 is mounted on a chassis (not shown). The circuit components, with the exception of the power transistor of the power controller and a control transistor, are suitably wired and mounted in conventional manner within the unit, and the entire assembly is suspended in a potting compound.

Figure 2:
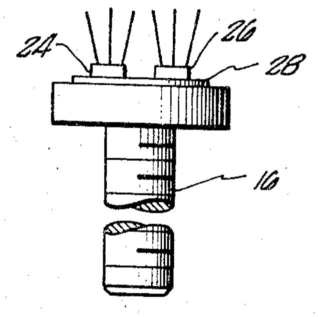
FIG. 2 is an enlarged view of the mounting arrangement of the power transistor in the power controller.
Figure 3:
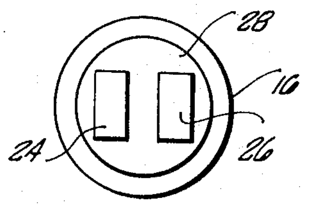
FIG. 3 is an end view of the mounting structure of FIG. 2.

In accordance with one feature of the present invention, as shown in FIGS. 2 and 3, a power transistor chip, indicated at 24, and a control transistor chip, indicated at 26, are cemented or soldered on the head of the stud 16. A beryllium oxide layer 28 is provided between the transistor chips and the head of the stud to provide electrical insulation while providing good thermal conductivity. The stud is preferably made of copper or brass providing a good heat-conductive path directly to the chassis when the stud is properly mounted.

Figure 4:
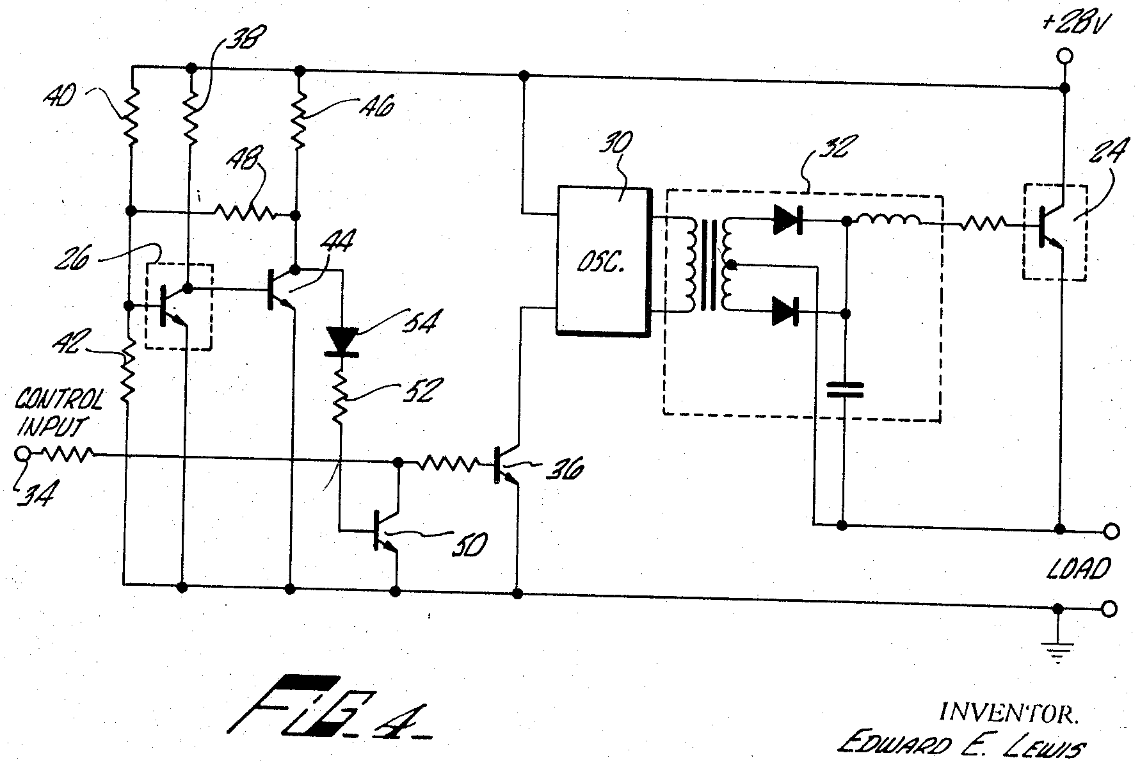
FIG. 4 is a schematic wiring diagram of the control circuit.

Referring to FIG. 4, the thermo-control circuit for the power transistor is shown. Power transistor 24 normally connects a load across a DC power source. The power transistor 24 is shown as being turned on and off by base current derived from the output of an oscillator 30. The oscillator output is applied to a full-wave rectifier 32 which is connected between the base and emitter electrodes of the power transistor 24. To turn on the power transistor, a control signal is applied at an input terminal 34 which, in turn, is connected to the base of a transistor 36. Transistor 36 connects the input to the oscillator 30 across the DC supply. Thus, when the transistor 36 is turned on by current applied at the input control terminal, the oscillator is turned on, producing base current for turning on the power transistor 24.

To protect the power transistor 24 against overheating, the control transistor chip 26 is utilized to sense changes in temperature of the mounting stud 16. The emitter-collector circuit of the transistor 26 is connected across the supply source through a collector load resistor 38. The base of the control transistor 26 is connected to a voltage divider including a resistor 40 and resistor 42 connected in series across the supply voltage. The values of the resistors 40 and 42 are such that the base is held slightly below the base-to-emitter junction potential $e_{b\text{-}e}$ required to turn on the transistor. However, the base-to-emitter junction potential $e_{b\text{-}e}$ is a function of temperature and the higher the temperature, the lower the base-to-emitter junction potential. Thus, as the temperature of the control transistor 26 rises, a temperature is reached at which the transistor begins to conduct base current.

The collector of the control transistor is applied to the base of a transistor 44 having a load resistor 46 connecting the emitter-collector circuit of the transistor 44 across the supply voltage. The transistor 44 is normally turned on. However, as the control transistor 26 begins to turn on due to a rise in temperature above the normal operating range, transistor 44, in turn, begins to turn off. Regenerative feedback is provided by means of a resistor 48 connecting the collector of the transistor 44 back to the base of the transistor 26. Thus, as the transistor 44 begins to turn off and the collector potential begins to rise, the base current in the transistor 26 is increased, further turning on the transistor 26 until the transistor 26 is fully turned on, and the transistor 44 is fully turned off.

The above-described control circuit is used to turn off the transistor 36. This is accomplished by providing a base current shunting transistor 50 connected between the base and the emitter of the transistor 36. The base of the shunting transistor 50 is connected to the collector of the transistor 44 through a current-limiting resistor 52 and diode 54. Thus, when the transistor 44 turns off, the transistor 50 is turned on, shunting base current away from the transistor 36 and thereby turning off transistor 36. This, in turn, cuts off the oscillator 30, stopping base current to the power transistor 24 and thereby turning off the power transistor.

From the above description, it will be recognized that an effective arrangement is provided for limiting the temperature rise of a power transistor and protecting the power transistor from destructive overheating. It protects against failure of the power controller unit because the unit has been improperly mounted on a heat sink, or operated without mounting it at all.

I claim:

1. A thermal protection circuit for a power transistor comprising a temperature-sensitive control transistor in which the base-to-emitter junction voltage decreases with increase in temperature, a thermal-conductive mounting stud adapted to be secured to a heat sink, the power transistor and control transistor each including a semiconductor element secured to the mounting stud, a bias circuit for applying a bias voltage between the base and emitter of the control transistor, the bias voltage normally being slightly less than the base-to-emitter voltage drop in the desired temperature operating range of the control transistor when the power transistor is conducting current to a load, a second transistor coupled to the output of the control transistor, the second transistor being turned on when the control transistor is turned off, a feedback resistor connecting the collector of the second transistor to the base of the control transistor for increasing the base current in the control transistor as the second transistor is turned off, and a bias control circuit for the power transistor including an oscillator, a rectifier and means coupling the alternating current signal from the output of the oscillator to the rectifier, the rectifier providing a direct current bias to the power transistor to turn the power transistor on, a transistor switch responsive to a control signal for turning the oscillator on in response to a control signal, and means coupled to the second transistor for biasing off the transistor switch when the second transistor is turned off.